March 11, 1958     M. H. THORNTON     2,825,929
METHOD FOR REMOVING FISH BONES
Original Filed May 13, 1954     2 Sheets-Sheet 1
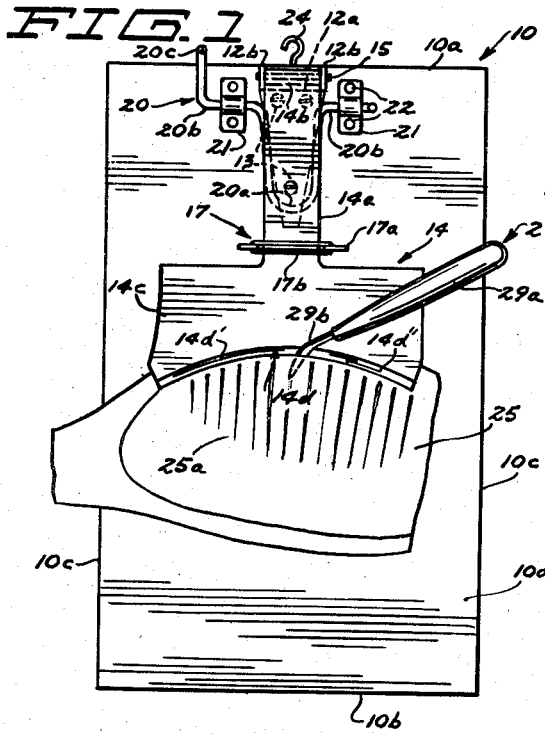
FIG. 1
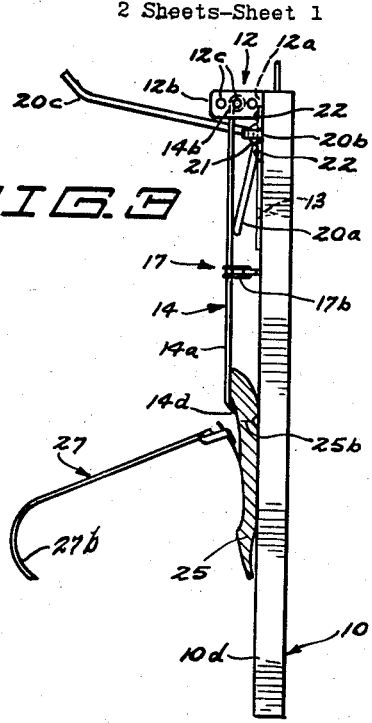
FIG. 3
FIG. 2
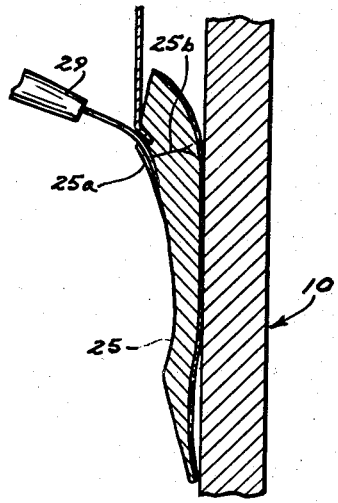
FIG. 4
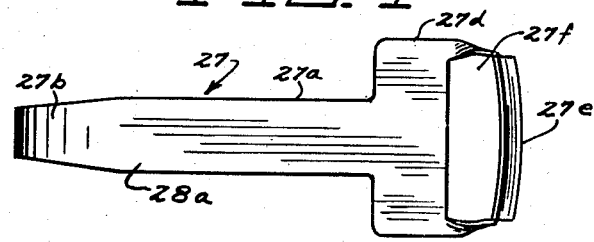
FIG. 5
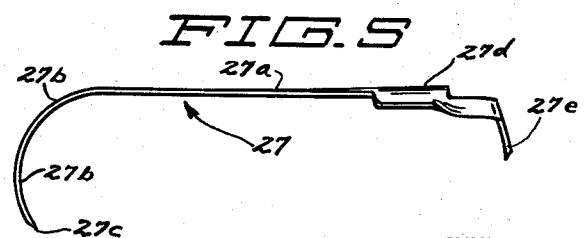
INVENTOR.
MATHEW H. THORNTON
BY Chas. C. Reif
ATTORNEY March 11, 1958 — M. H. THORNTON — 2,825,929
METHOD FOR REMOVING FISH BONES
Original Filed May 13, 1954 — 2 Sheets-Sheet 2

INVENTOR.
MATHEW H. THORNTON
BY Chas. C. Reif
ATTORNEY

United States Patent Office  
2,825,929  
Patented Mar. 11, 1958

2,825,929
METHOD FOR REMOVING FISH BONES

Mathew H. Thornton, St. Paul, Minn.

Original application May 13, 1954, Serial No. 429,437. Divided and this application February 11, 1957, Serial No. 639,580

1 Claim. (Cl. 17—45)

This invention relates to a method for boning a fish steak. This application is a division of application Serial No. 429,437, filed May 13, 1954. Generally when a fish, such as a bass, walleyed pike and other pike, and pan fish, such as crappies, sun fish and perch, have been steaked with the back bone removed, there will still remain the ribs from which the back bone has been cut free and there will also remain a row of fine bones which extend in a plane substantially at right angles to the plane of said steak and which normally are connected to the ribs of the fish adjacent the point where said ribs are joined to the back bone. Said fine row of bones extend almost to the outer layer of skin of said steak. It is desirable to have these bones removed entirely in order to have the fullest enjoyment from eating said steak as said fine bones are difficult to remove and if not removed are apt to stick in the mouth or throat of the eater and are constantly being removed by hand from the mouth which interferes with the full enjoyment of the eating of said steak.

It is therefore an object of this invention to provide a method for preparing a fish steak to remove all of the bones therefrom.

It is another object of this invention to provide a method for preparing a fish steak which may be applied in one form by a plate member having a clamp thereon with a concavely curved guiding edge portion to grip the upper side portion of a fish steak adjacent the upper ends of the rib section therein, a member for raising the ends of said ribs and lifting them away from said steak, a second member to be guided along said guiding edge portion in a plane approximately at right angles to the plane of said steak to sever said steak under the rib ends and substantially all the way through to the layer of skin at the outer side, said member being used for making a second cut in said steak generally similar to said first cut but inwardly thereof a short distance, said first mentioned member having a portion for scooping out said strip of fish steak between said cuts and removing the same with all the bones therein, whereby said steak is completely freed of bones.

It is another object of this invention to provide a method for preparing a fish steak which may be applied by a steak-supporting plate-like member, a clamping member pivoted to said supporting member, said clamping member having a concave guiding edge portion, means for resiliently urging said clamp against said plate member for holding a steak, and means pivoted to said plate member for raising said clamping member.

It is a further object of this invention to provide a method for preparing a fish steak which may be more specifically applied by a plate-like supporting member, a bracket secured to one end of said supporting member, a clamp member which may be pivoted to said bracket at different distances above said supporting member and movable toward and away from the same, said clamp member having a concavely curved guiding end portion to extend substantially along the ends of the ribs of said steak, means secured to said plate member for resiliently urging said clamp against said supporting member, and means pivoted to said supporting member for raising said clamp member away from said supporting member, and a third member having a blade curved to cooperate with said guiding edge portion to remove said ribs, and means for removing the fine bones from said steak.

These and other objects and advantages of the invention will be fully set forth in the following description made in connection with the accompanying drawings in which like reference characters refer to similar parts throughout the several views and in which:

Fig. 1 is a plan view of applicant's device in operating position showing some parts in dotted lines;

Fig. 2 is a vertical section on an enlarged scale of a portion of applicant's device in operating position;

Fig. 3 is a view in side elevation of applicant's device in operating position;

Fig. 4 is a plan view on an enlarged scale of a portion of applicant's device;

Fig. 5 is a view similar to Fig. 4 in side elevation;

Figure 6:
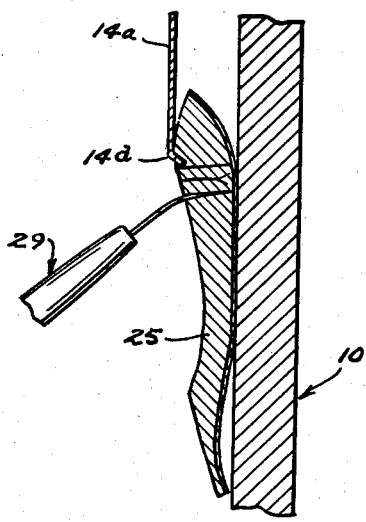
Fig. 6 is a vertical section on an enlarged scale of applicant's device in operating position.

A preferred embodiment of an apparatus for applying applicant's method is hereinafter set forth and described.

Referring to the drawings, and particularly to Figs. 1 and 3, a member 10 is shown forming a plate-like supporting member shown as generally rectangular in plan and preferably made of a rigid sheet material of some thickness, resistant to moisture and having a hardened upper surface resistant to scratches and other markings which might be made by a sharp instrument, such as a knife. Said member 10 is provided with end portions 10a and 10b, sides 10c and an upper surface 10d. Secured to said member 10 substantially centrally thereof and adjacent its upper end portion 10a is a bracket 12. Said bracket 12 comprises a base portion 12a secured to said member 10, as by screws or rivets 13. Said bracket 12 has upstanding facing side portions 12b having a plurality of horizontally alined vertically spaced holes 12c therein. A clamping member 14 is provided and is here disclosed as being generally T-shaped in plan and is preferably made of a rigid sheet metal material. Said member 14 has an elongated stem portion 14a having a loop 14b formed at its outer end adapted to be disposed between members 12b and being pivoted therein between a pair of said openings 12c by a pin or headed and nutted bolt 15. Said pin 15 will be disposed through a pair of said openings 12c and through said loop 14b. Said member 14 has a widened outer end portion 14c and said outer end portion is provided with a concavely curved outer down-turned edge portion 14d. Said edge portion 14d will have one portion 14d' curved to be approximately the same as the curvature of the outer rib line of the rib portion of the back of a pan fish, such as a sun fish or a crappie, as seen from one side of the fish, and said edge portion 14d will have another portion 14d" to be approximately the same as above said curvature of said fish as seen from the reverse or other side of said fish. A resilient member 17 is provided disposed about said member 14 adjacent said upper end portion 14c to urge said edge portion 14d against the upper surface of said member 10. Said member 17 is shown here as comprising a pair of hook members 17a secured to member 10 adjacent each side of portion 14a, and a resilient member 17b will overlie said portion 14a and have its ends secured to said member 17a. Said member 17b may be formed of a spring or elastic material and is here disclosed as a heavy rubber band. The tension placed upon said member 14 by said resilient member 17b may be easily varied by using more or fewer rubber bands 17b. A lever 20 is provided, shown here as being formed of a rod of small transverse dimension having a substantially U-shaped portion 20a to be disposed on member 10 beneath said portion 14a and having its end portions 20b bent outwardly to be parallel to the end portion of said member 10, and one portion is here shown bent upwardly to form an elongated handle portion 20c. Said member 20 is pivoted to said member 10 by brackets 21 disposed about portions 20b and secured to said member 10 by screws or rivets 22. A hook 24 is provided secured to the upper end portion of member 10.

A fish steak 25 is shown on member 10 in Fig. 1, and said fish steak represents a portion of a fish, such as described. Shown in said member 25 is rib portion 25a forming an outer rib line adjacent said downwardly curved portion 14d. Referring to Fig. 2, fine bones 25b are shown. Said fine bones are connected to the ribs 25a and extend outwardly almost to the skin of the steak.

Referring to Figs. 4 and 5, a member 27 is provided, shown here as being substantially T-shaped in plan and preferably made of a sheet metal material tempered so that its end portions may be sharpened to carry a cutting edge. Said member 27 has a handle portion 27a which terminates in a looped portion 27b. Said looped portion 27b is preferably provided with a cutting edge 27c at its outer end. Said member 27 has an upper plate portion 27d substantially rectangular in plan and having an outer blade portion 27e of reduced width in a plane substantially at right angles thereto. Said blade portion 27e is preferably provided with a cutting edge. A slot 27f is provided in said plate portion 27d adjacent said blade portion and of substantially the same width. Said blade portion 27e is concavely curved substantially at the same curvature as guiding edge 14d and is formed to cooperate with said guiding edge. A cutting member 29 is provided for use in the combination and method, the same having a handle portion 29a and a blade portion 29b with said blade having a slightly laterally curved end portion somewhat similar to the blade of a grapefruit knife.

In carrying out the method by the use of applicant's apparatus, member 10 will be placed on a suitable working surface. Fish steaks to be boned will have been previously provided having only the back bone portion of the fish removed therefrom. The operator will move member 20c backwardly to raise member 14 and fish steak 25 will be placed under said member 14 so that edge portion 14d will be placed on the upper side portion of the fish steak adjacent the rib line at the outer edge of the rib portion 25a. The curved portion 14d' will be adapted to be more nearly like the curvature of the rib portion of said steak 25 as taken from one side of said fish and the curved edge portion 14d" will be more nearly like the curvature of the rib portion of a steak from the other side of a fish. The operator can easily determine the proper longitudinal position of said steak 25 in relation to edge portion 14d. Member 20c is then released and said clamping member 14 will securely hold said steak 25 in position against member 10. Said member 14 is easily adapted to accommodate fish steaks of different thickness by having its end portion 14b pivoted to bracket 12 at a desirable distance above member 10 by means of the vertically spaced openings 12c in said bracket 12 to secure maximum tension.

With fish steak 25 in said position, said member 29 is taken in hand and the curved end portion of blade 29b will be disposed under the upper ends of ribs 25a at one end of the rib section, as shown in Fig. 2. The back of said blade portion will be moved along said guiding edge portion 14d and thus the ends of said bones 25b will be cut free from said ribs. Member 27 is then taken in hand by the operator, and as shown in Fig. 3, the portion 27e will be disposed against edge 14d and moved under the upper ends of said ribs and said member 27 will be moved longitudinally of said ribs and upwardly so that said ribs will be lifted away from steak 25 and said ribs will extend through said opening 27f. Member 27 will be moved along said guiding edge 14d to remove successive groups of said ribs until all have been removed. Said edge portion 27e is curved to cooperate with the curvature of edge portion 14d so that said edge portion 27e may be placed against said edge portion 14d and moved downwardly to be disposed under the end portions of said ribs.

Figure 7:
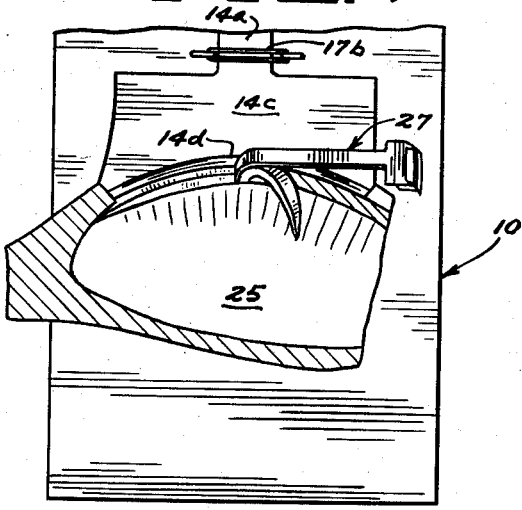
Fig. 7 is a plan view of a portion of applicant's device on an enlarged scale in operating position.
Figure 8:
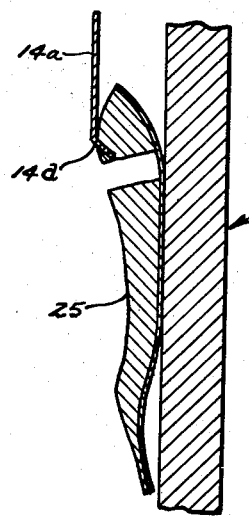
Fig. 8 is a portion of applicant's device in vertical section in an operating position.

The operator will next take member 29, and as shown in Fig. 1, will place the blade against edge portion 14d at one end of rib section 25a and will cut into said steak along said edge 14d in a plane at right angles to the plane of said steak and cut therethrough almost to the outer layer of skin of said steak. The operator will then remove member 29 from said steak 25 and make a second similar cut inwardly of said line of bones 25b for a short distance, as shown in Fig. 6. All of said bone members 25b which are located substantially at right angles to the upper edge portion of rib portion 25a will be located in said strip of said fish steak located between said first and second cuts. The looped end portion 27b of said member 27 is then inserted at one end of said strip of steak between said cuts and moved longitudinally of said strip guided by edge portion 14d' and said strip is scooped out, as shown in Fig. 7, whereby all the bones in said steak 25 will have been removed.

Said steak 25 is then removed from its position under clamp member 14 and is ready to be prepared for cooking and eating.

Thus it is seen that I have provided a very simple and efficient method for removing all of the bones from a fish steak so that the same may be eaten without the fear of swallowing any of the small bones which are generally found in a fish steak and without the inconvenience of having to pick said bones from the steak or from one's mouth when eating said fish. Said method has been amply tested and demonstrated in practice and found to be very successful in use.

It will of course be understood that various changes may be made in the steps and sequence of steps of the method without departing from the scope of applicant's invention, which, generally stated, consists in a method capable of carrying out the objects above set forth, such as disclosed and defined in the appended claims.

What is claimed is:

The method of boning a fish steak which consists of the steps of holding said steak in flat position with the inner side thereof facing upwardly, cutting along and through the ribs therein at the outer rib line to cut free the small bones extending therefrom, lifting the severed ends of said ribs upwardly and removing the same, cutting into said steak at said rib line at right angles to the plane of said steak and substantially therethrough, making a second similar cut a short distance inwardly from said first cut and scooping out the strip formed between said last two cuts whereby all of the small bones normally adjacent said ribs are removed and said steak is free of all bones.

References Cited in the file of this patent
UNITED STATES PATENTS

| | | |
|---|---|---|
| 2,234,658 | Smith | Mar. 11, 1941 |
| 2,750,623 | Baader | June 19, 1956 |
| 2,771,633 | Bartels et al. | Nov. 27, 1956 |